Dec. 4, 1951

S. B. COHN 2,577,510

MICROWAVE FILTER

Filed April 2, 1946

INVENTOR
SEYMOUR B. COHN
BY
William D. Hall
ATTORNEY

Patented Dec. 4, 1951 2,577,510

UNITED STATES PATENT OFFICE 2,577,510

MICROWAVE FILTER

Seymour B. Cohn, Cambridge, Mass., assignor to the United States of America as represented by the Secretary of War Application April 2, 1946, Serial No. 658,939

1 Claim. (Cl. 178—44)

This invention relates to high frequency transmission line filters and more particularly to low pass coaxial type filters.

Conventional low pass T- or Pi-section filters utilize concentric capacitors as the capacitor elements and sections of the inner conductor of a transmission line as the inductance elements. It is important that the filters be carefully designed so that the measured pass band response conforms to the calculated response very closely. This is especially desirable in filters for use in the microwave range of frequencies (i. e. having wavelengths of the order of centimeters). This invention has for one of its objects the utilization of distributed line parameters in the design and construction of microwave filters of the above kind, and more particularly of design criteria which gives more predictable results than those heretofore used or known.

It is another object of the invention to provide a low-pass filter of transmission line elements whose dimensions may be determined according to this invention.

It is another object of the invention to provide a novel method of predetermining the dimensions of a filter to obtain the desired characteristics of the filter.

For a better understanding of the invention, together with other and further objects thereof, reference is had to the following description, taken in connection with the accompanying drawing, wherein.

Figure 1:
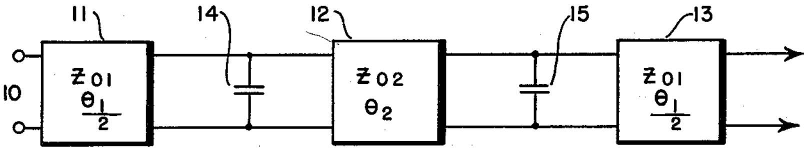
Fig. 1 is a schematic diagram of the basic equivalent circuit of a single filter section according to the present invention.

In general, the filter according to the invention is mechanically similar to the conventional coaxial type low-pass filter in that it utilizes concentric capacitors as the capacitor elements and lengths of the inner conductor of a transmission line as the inductance elements. Basically, the circuit for a single filter section is shown in Fig. 1 in which 10 is the input followed in turn by an end length 11, which may be a length of high impedance coaxial line, by a length of low characteristic impedance line 12, then by a length of high impedance line 13, etc., the number of lengths being determined according to the desired characteristics of the filter. Discontinuity capacitances resulting from abrupt changes in line diameters are represented by capacitances 14, 15, etc. The operation of the filter will be similar to that of the lumped constant filter shown in Fig. 2 at the pass band in which the high characteristic impedance sections are indicated by the coils 16 in Fig. 2 which act as inductances and in which the low characteristic impedance sections plus discontinuity capacitances are shown as the shunt capacitances 17.

Figure 2:
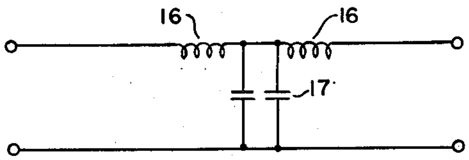
Fig. 2 is a simplified circuit diagram of Fig. 1.
Figure 3:
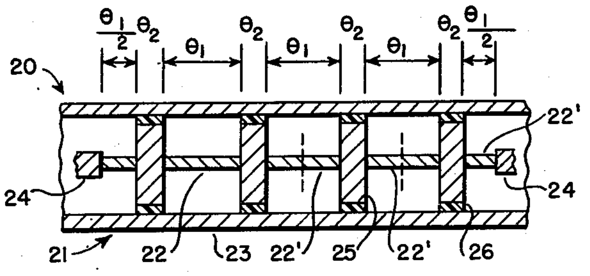
Fig. 3 is a longitudinal sectional view of a filter constructed according to the present invention.

The construction of a filter having four sections of the kind indicated in Figs. 1 and 2 is shown in Fig. 3. As shown, the filter 20 comprises a length or section of coaxial conductor line 21 having an inner conductor 22 and an outer concentric conductor 23 which may be inserted in or connected at each end thereof to a section of the usual type of coaxial conductor transmission line, the inner conductor of which is indicated at 24, in the circuit of an electrical system such as a communication or radio object-locating system.

Located substantially concentrically within outer conductor 23 are preferably a plurality of circular disks or short cylindrical members 25 of electrically conductive material. Each disk member 25 is so positioned that its circumferential surface is slightly spaced from the adjacent portion of outer conductor 23 and held in position by a suitable dielectric material 26, such as polystyrene, which may be inserted in the space between the disk 25 and the outer conductor 23. The disks 25 are disposed at spaced intervals along the length of filter 20 and are positioned in such a manner that they separate, while being in electrical connection with, sections of inner conductor 22 of substantially equal impedance. Thus as shown, the inner conductor 22 comprises a plurality of sections, each section being separated by a disk 25. The conductor sections 22 comprise the inductance elements and the disks 25 comprise the shunt capacitor elements of the filter 20. Thus, it will be seen that filter 20 comprises a plurality of filter sections each of which may be either an equivalent T-type section or a $\pi$-type section.

Each T-type section comprises a disk 25 separating a pair of inner conductor sections 22′, each section 22′ being of substantially equal impedance and being of substantially half the length of a section 22 between adjacent disks 25 of Fig. 3. When the filter is arranged with the $\pi$-type sections, each $\pi$-type section comprises a disk member 25 separated by a conductor section 22. Thus, the filter sections preferably are arranged so that the filter 20 comprises short lengths of alternate low and high characteristic impedance transmission line connected in series, $\theta_2$ and $\theta_1$, respectively, designating the angular lengths thereof in radians where $$\theta=\frac{2\pi l}{\lambda}$$

$l$ being the physical length in centimeters and $\lambda$ being the wavelength of the energy passing through filter 20 in centimeters. As shown in Fig. 3, the filter 20 comprises four T-type sections, the terminations of filter 20 occurring at the center of a high impedance length of the transmission line. It will be understood, however, that when the filter 20 comprises $\pi$-type sections, they are terminated at the center of a low impedance length of line instead of a high impedance line as shown in Fig. 3.

In order to design a low-pass filter having the desired characteristics, and to obtain the desired results in a more predictable manner, it is preferable that the following design method be followed, where the discontinuity capacitance caused by the termination of the E field on the transverse surfaces of the disk members 25, which will usually be appreciable, is taken into consideration. First, the length of $\theta_{1c}$ and a tentative length of $\theta_{2c}$, which neglects the discontinuity capacitance effect, are chosen to have respective values such as to cause spurious responses to fall outside of the desired frequency range. $\theta_{1c}$ represents the length of the high impedance section of line between adjacent disk members 25 at the cut-off frequency and $\theta_{2c}$ designates the electrical length of the low impedance line at the cut-off frequency represented by the thickness of each of the disk members 25. The ratio of the characteristic impedances of the sections or lengths of line of disks 25 and the distance between adjacent disks 25 may then be calculated from the formula:

(1)
$$\frac{Z_{01}}{Z_{02}}=\rho=\frac{\cot\frac{\theta_{1c}}{2}}{\tan\frac{\theta_{2c}}{2}}$$

It then follows that $$Z_{02}=\frac{Z_{01}}{\rho}$$

A value of zero frequency characteristic impedance $K_{00}$ is then assumed, then $Z_{01}$ found from the following relationship:

(2)
$$Z_{01}=K_{00}\sqrt{\frac{\frac{\theta_{1c}}{\theta_{2c}}+\rho}{\frac{\theta_{1c}}{\theta_{2c}}+\frac{1}{\rho}}}$$

By substitution the diameters of inner conductor sections 22 or 22' and of disks 25 may then be found from these values in a well known manner. The actual electrical length $\bar{\theta}_{2c}$ of disks 25, corrected for discontinuity capacitance effect, may then be determined from the following equation:

(3)
$$\bar{\theta}_{2c}=2\arctan\left(\tan\frac{\theta_{2c}}{2}-B_cZ_{02}\right)$$

where $B_c$ is the discontinuity susceptance which may be calculated from the following equation:

(4)
$$B_c=[4\pi^2 f_c r_3\, C_{d1'}\,(\alpha,\tau)]\,[10^{-6}]$$

where $f_c$ is in megacycles per second, $r_3$ is the inner radius of the outer conductor of the coaxial line in centimeters, and $C_{d1'}\,(\alpha,\tau)$ is the discontinuity capacitance in micro-microfarads per centimeter circumference calculated in accordance with curves given by J. R. Whinnery, H. W. Jamieson, and Theo Eloise Robbins, Proc. of IRE, vol. 32, 695 (1944).

Thus the lengths of the filter sections designated by the thickness of disks 25 and the spacings between adjacent disks 25 (of line section 22) may be calculated from the electrical lengths $\theta_{1c}$ and $\theta_{2c}$ according to the above relations by taking into account the dielectrics used.

It has been found that a filter constructed and designed as hereinbefore described has a measured pass band response which conforms extremely closely to the calculated response; that is, it is possible according to this invention to design a low-pass filter much more easily and with more predictable results than has heretofore been known.

Figure 4:
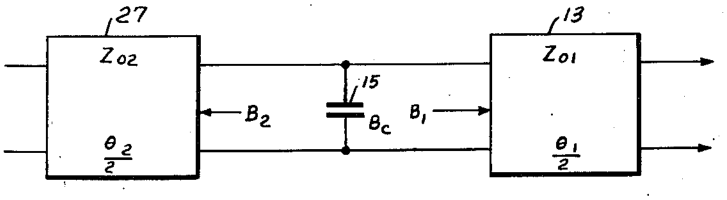
Fig. 4 is a diagram of a half of the section shown in Fig. 1.

The derivation of the design formulae used will be made most readily apparent if consideration is first given to Fig. 4 which is a schematic diagram of one half the filter section shown in Fig. 1, where 27 is one half of 12 and the other numbered elements correspond to those similarly numbered in Fig. 1. The symbols shown below have the same meaning as given in Formulae 1, 2, 3 and 4.

$B_1$ and $B_2$ are the respective susceptance of $Z_{01}$ and $Z_{02}$ and $B_c$ is the discontinuity susceptance.

By inspection we see that the mid $\theta_1$ characteristic impedance, $K_{01}$, must be zero at cut-off, while the mid $\theta_2$ characteristic impedance, $K_{02}$, must be infinite. Assume terminations on an image basis. Then the filter is matched at every point and hence the following relation holds at cutoff:

$$B_1+B_2+B_c=0 \qquad (a)$$

where $$B_1=-\frac{1}{Z_{01}}\cot\frac{\theta_{1c}}{2} \qquad (b)$$

$$B_2=\frac{1}{Z_{02}}\tan\frac{\bar{\theta}_{2c}}{2} \qquad (c)$$

Therefore $$-\cot\frac{\theta_{1c}}{2}+\frac{Z_{01}}{Z_{02}}\tan\bar{\theta}_{2c}+B_cZ_{01}=0 \qquad (d)$$

If $B_c$ is zero, $$\frac{Z_{01}}{Z_{02}}=\frac{\cot\frac{\theta_{1c}}{2}}{\tan\frac{\bar{\theta}_{2c}}{2}} \qquad (e)$$

which is Equation 1.

With $B_c$ taken into account, $$\tan\frac{\bar{\theta}_{2c}}{2}=\frac{\cot\frac{\theta_{1c}}{2}}{\frac{Z_{01}}{Z_{02}}}-B_cZ_{02} \qquad (f)$$

or substituting Equation $e$ $$\tan\frac{\bar{\theta}_{2c}}{2}=\tan\frac{\theta_{2c}}{2}-B_cZ_{02}$$

or $$\bar{\theta}_{2c}=2\arctan\left(\tan\frac{\theta_{2c}}{2}-B_cZ_{02}\right) \qquad (g)$$

which is Equation 3, above.

The characteristic impedance is most simply derived by matrix algebra. Since the zero frequency characteristic impedance $K_{00}$ is of principal interest, $B_c$ will be neglected. The matrix for this half section is:

$$\begin{bmatrix}E_1\\ I_1\end{bmatrix}\times\begin{bmatrix}\cos\frac{\theta_2}{2} & jZ_{02}\sin\frac{\theta_2}{2}\\ j\frac{\sin\frac{\theta_2}{2}}{Z_{02}} & \cos\frac{\theta_2}{2}\end{bmatrix}\times\begin{bmatrix}\cos\frac{\theta_1}{2} & jZ_{01}\sin\frac{\theta_1}{2}\\ j\frac{\sin\frac{\theta_1}{2}}{Z_{01}} & \cos\frac{\theta_1}{2}\end{bmatrix}\times\begin{bmatrix}E_2\\ I_2\end{bmatrix} \qquad (h)$$

performing the matrix multiplication converts this matrix into the form:

$$\begin{bmatrix} E_1 \\ I_1 \end{bmatrix} = \begin{bmatrix} A' & B' \\ C' & D' \end{bmatrix} \times \begin{bmatrix} E_2 \\ I_2 \end{bmatrix} \qquad (j)$$

where A′, B′, C′, D′ represent the product terms of the matrix multiplication. Having calculated A′, B′, C′, and D′, the respective characteristic impedances $K_{01}$ and $K_{02}$ are:

$$K_{01} = \sqrt{\frac{B'}{C'}}\sqrt{\frac{D'}{A'}},\ K_{02} = \sqrt{\frac{B'}{C'}}\sqrt{\frac{A'}{D'}} \qquad (k)$$

$$\cosh \Gamma = 2A'D' - 1$$

where Γ is the propagation constant for a whole section.

On performing the indicated operation one obtains for $K_{01}$, $$K_{01} = \sqrt{\frac{\left(Z_{01}\sin\frac{\theta_1}{2}\cos\frac{\theta_2}{2} + Z_{02}\cos\frac{\theta_1}{2}\sin\frac{\theta_2}{2}\right)\left(\cos\frac{\theta_1}{2}\cos\frac{\theta_2}{2} - \frac{Z_{01}}{Z_{02}}\sin\frac{\theta_1}{2}\sin\frac{\theta_2}{2}\right)}{\left(\frac{1}{Z_{02}}\cos\frac{\theta_1}{2}\sin\frac{\theta_2}{2} + \frac{1}{Z_{01}}\sin\frac{\theta_1}{2}\cos\frac{\theta_2}{2}\right)\left(\cos\frac{\theta_1}{2}\cos\frac{\theta_2}{2} - \frac{Z_{02}}{Z_{01}}\sin\frac{\theta_1}{2}\sin\frac{\theta_2}{2}\right)}} \qquad (l)$$

$K_{02}$ is the same except that all subscripts are interchanged between corresponding terms.

The zero frequency is:

$$K_{01}\Big]_{f=0} = K_{02}\Big]_{f=0} = K_{00} = Z_{01}\sqrt{\frac{\frac{\theta_1}{\theta_2} + \frac{Z_{02}}{Z_{01}}}{\frac{\theta_1}{\theta_2} + \frac{Z_{01}}{Z_{02}}}}$$

$$Z_{01} = K_{00}\sqrt{\frac{\frac{\theta_1}{\theta_2} + \rho}{\frac{\theta_1}{\theta_2} + \frac{1}{\rho}}} \qquad (m)$$

This relationship also holds true at the cutoff frequency so that $$Z_{01} = K_{00}\sqrt{\frac{\frac{\theta_{1c}}{\theta_{2c}} + \rho}{\frac{\theta_{1c}}{\theta_{2c}} + \frac{1}{\rho}}} \qquad (n)$$

which is Equation 2.

While there has been described what is at present considered the preferred embodiment of the invention, it will be obvious to those skilled in the art that various changes and modifications may be made therein without departing from the invention.

What is claimed is:

A low-pass filter of the coaxial type for use within the microwave range of frequencies of electromagnetic energy comprising: concentric inner and outer conductors insulated from each other; said outer conductor being of uniform diameter; said inner conductor comprising alternate sections having respectively first and second diameters; said second diameter being larger than said first diameter; sections of said inner conductor of like diameter having equal axial lengths, whereby the sections of said inner conductor having said first diameter and sections of said outer conductor adjacent thereto form high characteristic impedance portions of said filter and the sections of said inner conductor having said second diameter and sections of said outer conductor adjacent thereto form low characteristic impedance portions of said filter; the axial lengths and diameters of the components of said high and low characteristic impedance portions having dimensions defined in accordance with the following formulae:

$$\frac{Z_{01}}{Z_{02}} = \rho = \frac{\cot\frac{\theta_{1c}}{2}}{\tan\frac{\theta_{2c}}{2}}$$

$$Z_{02} = \frac{Z_{01}}{\rho}$$

where $\theta_{1c}$ is the electrical length in radians at the desired cut-off frequency of each of said high characteristic portions, $\theta_{2c}$ is the electrical length in radians at the desired cut-off frequency of each of said low characteristic portions neglecting the discontinuity capacitance at the junctions of said high and low characteristic impedance portions, $\theta_{1c}$ and $\theta_{2c}$ being so chosen that spurious responses fall outside of the desired frequency range, and $$\frac{Z_{01}}{Z_{02}}$$

is the ratio of the characteristic impedance of each high characteristic impedance portion to the characteristic impedance of each low characteristic impedance portion;

$$Z_{01} = K_{00}\sqrt{\frac{\frac{\theta_{1c}}{\theta_{2c}} + \rho}{\frac{\theta_{1c}}{\theta_{2c}} + \frac{1}{\rho}}}$$

where $K_{00}$ is the assumed value of the zero frequency characteristic impedance;

$$\bar{\theta}_{2c} = \arctan\left(\tan\frac{\theta_{2c}}{2} - B_c Z_{02}\right)$$

where $\bar{\theta}_{2c}$ is the electrical length in radians at the desired cut-off frequency of each of said low characteristics corrected for said discontinuity capacitance and $B_c$ is the susceptance at the desired cut-off frequency of said discontinuity capacitance; and $$B_c = [4\pi^2 f_c r_3 C_{d1}'(\alpha,\tau)][10^{-6}]$$

where $f_c$ is the desired cut-off frequency in megacycles per second, $r_3$ is the radius of said outer conductor in centimeters, and $C_{d1}'(\alpha,\tau)$ is said discontinuity capacitance in micromicrofarads per centimeter of the inner circumference of said outer conductor.

SEYMOUR B. COHN.

REFERENCES CITED

The following references are of record in the file of this patent:

UNITED STATES PATENTS

| Number | Name | Date |
|---|---|---|
| 2,183,123 | Mason | Dec. 12, 1939 |
| 2,411,555 | Rogers | Nov. 26, 1946 |

OTHER REFERENCES

Proceedings I. R. E., vol. 32, No. 11, November 1944 (pages 696–709).